United States Patent [19]
Blount

[11] 4,321,360
[45] * Mar. 23, 1982

[54] PRODUCTION OF CARBOHYDRATES

[76] Inventor: David H. Blount, 5450 Lea St., San Diego, Calif. 92105

[*] Notice: The portion of the term of this patent subsequent to Oct. 7, 1997, has been disclaimed.

[21] Appl. No.: 265,701

[22] Filed: May 21, 1981

Related U.S. Application Data

[63] Continuation-in-part of Ser. No. 149,178, May 12, 1980, abandoned, which is a continuation-in-part of Ser. No. 13,139, Feb. 21, 1979, Pat. No. 4,226,982.

[51] Int. Cl.³ .............................................. C08B 15/00
[52] U.S. Cl. ........................................ 536/1; 536/101
[58] Field of Search ................................... 536/1, 101

[56] References Cited

U.S. PATENT DOCUMENTS

| | | | |
|---|---|---|---|
| 1,261,328 | 4/1918 | Wagner | 536/1 |
| 1,758,655 | 5/1930 | Dorner | 536/1 |
| 2,518,235 | 8/1950 | Hartstra et al. | 536/1 |
| 2,709,699 | 5/1955 | Wolf et al. | 536/1 |
| 3,970,712 | 7/1976 | Friese | 536/1 |
| 4,226,982 | 10/1980 | Blount | 536/101 |

Primary Examiner—Ronald W. Griffin

[57] ABSTRACT

Cellulose-containing plants are broken down by mixing with an alkali metal hydroxide, then heated to 150° C. to 220° C. while agitating for 5 to 60 minutes, thereby producing a broken-down alkali metal cellulose-containing plant polymer, then mixed with an acid compound until the pH is 5 to 7, thereby producing a lignin-cellulose resinous product and a mixture of carbohydrates.

4 Claims, No Drawings

PRODUCTION OF CARBOHYDRATES

CROSS-REFERENCE TO RELATED APPLICATIONS

This application is a continuation-in-part of my copending U.S. Patent Application, Ser. No. 149,178, filed May 12, 1980, now abandoned, which is a continuation-in-part of my copending U.S. Patent Application, Ser. No. 013,139, filed Feb. 21, 1979, now U.S. Pat. No. 4,226,982.

BACKGROUND OF THE INVENTION

This invention relates to a novel and economical process to break down particles of cellulose-containing plants into lignin-cellulose resinous products, $CO_2$ and carbohydrates. In U.S. Patent Application Ser. No. 013,139, filed Feb. 21, 1979, by David H. Blount, M.D., it illustrated the process to break down cellulose-containing plants into water-soluble polymers, but did not include the discovery of carbohydrates' being produced in the process.

In the process of this invention, the cellulose-containing plant, such as wood, is broken down into water-soluble alkali metal lignin-cellulose polymer, carbohydrates and sodium carbonate. The lignin-cellulose bond is not broken in most of the cases, but the molecules of cellulose are broken into $CO_2$ and carbohydrates. The carbohydrates appear to be a mixture, with glucose being the predominant carbohydrate.

The alkali metal lignin-cellulose may be separated from the carbohydrate by using an organic solvent such as ketones, alcohols and many other solvents.

The carbohydrates produced by this process may be utilized to produce ethanol by fermentation as a food for animals and humans, and may be further reacted with organic epoxides, mono- and polysubstituted organic compounds to produce new and useful products.

The lignin-cellulose resinous product may be used as an adhesive such as in producing plywood, in laminates, as filler, etc., and may be further reacted with aldehydes, aminoplasts, phenoplasts, epoxides, ketones, furfuryl alcohol, amines, isocyanates, polyamines, polyisocyanates, mono- and polysubstituted organic compounds such as polyhalides, monohalides, organic anhydrides, epihalohydrins, halohydrins and other organic compounds to produce useful resins which ma be utilized as adhesives, as laminates, as coating agents, as molding agents, as foams. The lignin-cellulose resinous products are soluble in common organic solvents such as ketones, alcohols, glycols, organic esters, etc.

Lignin-cellulose resinous products, $CO_2$ and carbohydrates are produced by reacting the following components:

Component (a): A cellulose-containing plant;
Component (b): An alkali metal hydroxide;
Component (c): A salt-producing compound.

Component (a)

Any suitable cellulose-containing plant or the products of cellulose-containing plants which contain cellulose may be used in this invention. The plant material is preferred to be in the form of small particles such as sawdust. In nature, cellulose is widely distributed. It is found in all plants and they may be used in this process, preferably in a dry, small-particle form.

Suitable cellulose-containing plants include, but are not limited to, trees, e.g., spruce, pine, hemlock, fir, oak, ash, larch, birch, aspen, poplar, cedar, beech, maple, walnut, cypress, redwood, cherry, elm, chestnut, hickory, locust, sycamore, tulip, tupelo, butternut, apple, alder, magnolia, dogwood, catalpa, boxwood, crabwood, mahogany, greenheart, lancewood, letterwood, mora, prima vera, purpleheart, rosewood, teak, satinwood, mangrove, wattle, orange, lemon, logwood, fustic, osage orange, sappanwood, Brazilwood, barwood, camwood, sandalwood, rubber, gutta, mesquite, and shrubs, e.g., oleander, cypress, junipers, acanthus, pyracantha, ligustrum, lantana, bougainvillea, azalea, feijoa, ilex, fuscia, hibiscus, datura, holly, hydrangea, jasmine, eucalyptus, cottoneaster, xylosma, rhododendron, castor bean, eugenia, euonymus, fatshedera, aralia, etc., and agricultural plants, e.g., cotton, cotton stalks, corn stalks, corn cobs, wheat straw, oat straw, rice straw, cane sugar (bagasse), soybean stalks, peanut plants, pea vines, sugar beet waste, sorghum stalks, tobacco stalks, maize stalks, barley straw, buckwheat straw, quinoa stalks, cassava, potato plants, legume vines and stalks, vegetable inedible portion, etc., weeds, grasses, vines, kelp, flowers and algae. Wood fibers and cotton fibers are the preferred cellulose-containing materials. The waste products of agricultural plants which contain cellulose may be air-dried, then ground into small particles and used in this invention. Commercial waste products containing cellulose, e.g., paper, cotton cloth, bagasse wallboard, wood products, etc., may be used in this invention. Wood with the lignin removed (wood pulp) may be used in this invention.

Cellulose-containing plants which have been partially decomposed, such as humus, peat and certain soft brown coal, may be used in this invention.

Other products of cellulose-containing plants may be recovered in the process of this invention such as waxes, gums, oils, sugars, wood alcohol, agar, rosin, turpentine, resins, rubber latex dyes, etc.

Component (b)

Any suitable alkali compound may be used in this invention. Alkali metal compounds are preferred, such as alkali metal oxides, alkali metal hydroxide, alkali metal silicates and mixtures thereof. Mixtures of sodium hydroxide and calcium hydroxide may be used. Suitable alkali metal hydroxides include sodium hydroxide, potassium hydroxide and mixtures thereof. Sodium hydroxide is the preferred alkali compound.

Component (c)

Any suitable salt-forming compound may be used. Suitable salt-forming compounds include mineral acids, organic acid, organic acid halides, hydrogen-containing acid salts, e.g., sodium hydrogen sulfate, potassium hydrogen sulfate, sodium dihydrogen phosphate and mixtures thereof. Mineral acids are preferred, especially sulfuric acid and hydrochloric acid.

Further examples of salt-forming compounds may be found in German Pat. No. 1,178,586 and U.S. Pat. No. 3,480,592.

Any suitable method may be used to ferment the carbohydrates produced by the process of this invention to produce ethanol. Any suitable yeast which ferments a carbohydrate to produce ethanol may be added to an aqueous solution containing 10% to 40% by weight of carbohydrates produced by the process of this invention, then 5 grams of yeast per 1 to 5 gallons of the aqueous solution of carbohydrates are added. The yeast may be sprinkled on top of the solution at a temperature of 70° F. 80° F. for 12 hours, then stirred in after 12 hours. Stir extremely well and make a lot of bubbles in the mixture. Oxygen from the air helps the yeast grow. The mixture is fermented for up to 2 weeks or until the carbohydrates are used up. The ethanol is then recovered by distillation.

DETAILED DESCRIPTION OF THE INVENTION

The preferred process to produce carbohydrates is to mix about 2 parts by weight of air-dried fine particles of a cellulose-containing plant with 1 to 3 parts by weight of a melted alkali metal hydroxide which is at a temperature of 150° C. to 220° C. while agitating for 5 to 60 minutes, thereby producing a water-soluble broken-down alkali metal cellulose-containing plant polymer, then a salt-forming compound is mixed with the broken-down alkali metal cellulose-containing plant polymer in an amount wherein the acid radicals are about equal to, or greater than, the alkali metal radicals, thereby producing a mixture of lignin-cellulose resinous product, $CO_2$, carbohydrates and salt; water is then added to the mixture until a solution is produced that contains 20% to 70% solids. The pH is then adjusted to a pH of 5 to 6.5 and the lignin-cellulose resinous product floats to the top or is precipitated and is separated from the aqueous solution of carbohydrates by filtration or decantation. By evaporating the water under reduced pressure, the carbohydrates are recovered and allowed to crystallize.

The uses of carbohydrates are commonly known in the arts. The carbohydrates produced by the process of this invention may be fermented to produce ethanol which may be used for fuel or as an alcoholic beverage. The carbohydrate and salt solution may be evaporated to a solid, then mixed with cattle feed and used to feed cattle, horses, sheep, goats, rabbits, etc. The carbohydrates may be separated from the salt and used for food. The carbohydrates may be reacted with organic epoxides to produce polyols which are used in the production of rigid polyurethane foams and resinous products.

The object of this invention is to produce carbohydrates from cellulose-containing plant material. Another object is to produce carbohydrates which may be used for food, in the production of ethanol and as the intermediate in the production of other useful organic polymers.

DESCRIPTION OF PREFERRED EMBODIMENTS

My invention will be illustrated in detail by the specific examples which follow, it being understood that these preferred embodiments are illustrative of, but not limited to, procedures which may be used in the production of carbohydrates. Parts and percentages are by weight unless otherwise indicated.

EXAMPLE 1

About 1 part by weight of melted lye flakes (NaOH) and 2 parts by weight of fir sawdust are mixed, then heated to 150° C. to 220° C. while agitating at ambient pressure, with care being taken that the mixture does not burn, for 5 to 60 minutes or until the mixture softens and expands into a dark-brown, thick liquid when hot. It cools to a solid, thereby producing a water-soluble broken-down akali metal cellulose-containing plant polymer; the dilute sulfuric acid is added until the pH is 5 to 6.5 while agitating, thereby producing a dark-brown lignin-cellulose resinous product which floats to the top, $CO_2$ is given off, salt and an aqueous solution of carbohydrates. The lignin-cellulose resinous product is recovered by filtration, then ground into a powder, washed with water to remove any salt, then dried. The lignin-cellulose resinous product softens at about 120° C. and may be molded into useful products by heat and pressure.

EXAMPLE 2

About equal parts by weight of dry pine sawdust are added to melted sodium hydroxide flakes which are at about 150° C. to 220° C. while agitating and the mixture expands into a dark-brown, thick liquid which solidifies on cooling, thereby producing broken-down alkali metal cellulose-containing plant polymer. The polymer is added to water to make an aqueous solution containing 50% solids. About 90% of the original sawdust is soluble in water. The unsoluble portion is filtered off, then hydrochloric acid is added while agitating until the pH is 5 to 6.5, thereby producing a lignin-cellulose resinous product which floats to the top of the solution or precipitates, $CO_2$ is given off and an aqueous solution of carbohydrates. About 30% to 40% of the sawdust is converted to carbohydrates which may be used as food or fermented to ethanol.

EXAMPLE 3

About 2 parts by weight of potassium hydroxide are heated to 150° C. to 220° C., then 3 parts by weight of white oak sawdust are added while agitating at ambient pressure for 5 to 60 minutes or until all the sawdust softens and expands to form a thick liquid, thereby producing a water-soluble broken-down cellulose-containing plant polymer. An aqueous solution of sodium hydrogen sulfate is mixed with the polymer until the pH is 5 to 6.5, thereby producing $CO_2$, lignin-cellulose resinous product and an aqueous solution of carbohydrates.

EXAMPLE 4

About 2 parts by weight of melted sodium hydroxide and 3 parts by weight of dry small particles of the fir wood are mixed at 150° C. to 220° C. while agitating for 5 to 60 minutes, thereby producing broken-down alkali metal cellulose-containing plant polymer. Acetic acid is then mixed with the polymer in an amount wherein the acid radicals are about equal to the alkali metal radical or until the pH is 5 to 6.5 as tested in water, thereby producing $CO_2$, lignin-cellulose resinous product and carbohydrates.

Other wood may be used in place of fir such as pine, redwood, cedar, oak, spruce, gum, hemlock, walnut, hickory, eucalyptus, birch, poplar, beech, maple, mahogany, aspen, ash, cypress, elm, cherry, sycamore, and mixtures thereof.

Other salt-forming compounds may be used in place of acetic acid such as sulfuric acid, hydrochloric acid, phosphoric acid, propionic acid, acetic acid chloride, maleic acid, glutaric acid anhydride, oxalic acid, potassium hydrogen sulfide, sodium dihydrogen phosphate and mixtures thereof.

EXAMPLE 5

About 3 parts by weight of melted sodium hydroxide flakes and 2 parts by weight of cellulose in the form of cotton are mixed at 150° C. to 220° C. while agitating at ambient pressure for 5 to 60 minutes, thereby producing a water-soluble, dark-brown, broken-down alkali metal cellulose polymer. Dilute sulfuric acid is then added to the polymer while agitating until the pH is 5 to 6.5, thereby producing a brown cellulose resinous product, $CO_2$ and carbohydrates. The cellulose resinous product is removed by filtration.

Other cellulose products may be used in place of cotton, such as wood pulp with lignin removed by soda process, wood pulp with lignin removed by the acid process, wood pulp from waste paper and mixtures thereof.

EXAMPLE 6

About 2 parts by weight of corn cob particles are added to melted sodium hydroxide at 150° C. to 220° C. while agitating at ambient pressure for 5 to 60 minutes, thereby preducing a water-soluble broken-down alkali metal cellulose plant polymer, dark brown in color. Dilute hydrochloric acid is added to said polymer until the pH is 5 to 6.5, thereby producing a lignin-cellulose resinous product, $CO_2$ and carbohydrates.

Other dry cellulose-containing plant particles may be used in place of corn cobs, such as corn stalks, seaweed, cotton stalks, rice straw, wheat straw, oat straw, barley straw, soybean stalks, cane sugar stalks, pea vines, bean vines, sugar beet waste, sorghum stalks, tobacco stalks, maize stalks, buckwheat stalks, weeds, bushes, grass, algae, humus, peat and mixtures thereof.

Although specific materials and conditions were set forth in the above examples, these were merely illustrative of preferred embodiments of my invention. Various other compositions, such as the typical materials listed above, may be used where suitable. The reactive mixtures and products of my invention may have other agents added thereto in order to enhance or otherwise modify the reaction and products. Other modifications of my invention will occur to those skilled in the art upon reading my disclosure. These are intended to be included within the scope of my invention, as defined in the appended claims.

I claim:
1. The process for the production of carbohydrates by the following steps:
   (a) mixing 2 parts by weight of a cellulose-containing plant with 1 to 3 parts by weight of a melted alkali metal hydroxide, then
   (b) agitating the mixture at 150° C. to 220° C. for 5 to 60 minutes, thereby
   (c) producing a water-soluble broken-down alkali cellulose polymer, then
   (d) adding a salt-forming compound in an aqueous solution until the pH is 5 to 6.5, thereby producing a non-water-soluble lignin-cellulose polymer, carbon dioxide and an aqueous solution of carbohydrates and salt, then
   (e) filtering off the lignin-cellulose polymer and recovering the aqueous solution of carbohydrates and salt.

2. The process of claim 1 wherein the alkali metal hydroxide is sodium hydroxide.

3. The process of claim 1 wherein the salt-forming compound is a mineral acid selected from the group consisting of sulfuric acid and hydrochloric acid.

4. The process of claim 1 when water is added in step (c) of claim 1 in an amount sufficient to produce a solution containing 20% to 70% solids.

* * * * *